United States Patent [19]

Smith

[11] Patent Number: 4,621,025
[45] Date of Patent: Nov. 4, 1986

[54] β-KETO AMIDE MODIFIED EPOXY RESINS

[75] Inventor: James D. B. Smith, Monroeville Boro, Pa.

[73] Assignee: Westinghouse Electric Corp., Pittsburgh, Pa.

[21] Appl. No.: 778,948

[22] Filed: Sep. 23, 1985

[51] Int. Cl.$^4$ ............................................. C08G 59/44
[52] U.S. Cl. .................................. 428/414; 528/103; 528/111; 528/119; 528/220; 528/102; 549/553
[58] Field of Search ............... 528/103, 111, 119, 220; 549/553; 428/414; 252/182

[56] References Cited

U.S. PATENT DOCUMENTS

| | | | |
|---|---|---|---|
| 2,589,245 | 3/1952 | Greenlee | 528/119 X |
| 2,801,228 | 7/1957 | Starck | 260/47 |
| 3,892,903 | 7/1975 | Dowbenko | 428/460 |
| 4,110,310 | 8/1978 | Schulze et al. | 528/119 |
| 4,173,593 | 11/1979 | Smith et al. | 525/109 |
| 4,321,304 | 3/1982 | Castellucci | 428/418 |
| 4,321,305 | 3/1982 | Castellucci | 428/418 |
| 4,579,933 | 4/1986 | Stockinger et al. | 528/119 |

*Primary Examiner*—Earl Nielsen
*Attorney, Agent, or Firm*—R. D. Fuerle

[57] ABSTRACT

Disclosed is a composition of an epoxy resin and about 0.1 to about 2 moles per epoxy equivalent weight of a β-diketo amide having the general formula

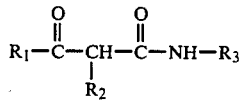

where $R_1$ is selected from the group consisting of alkyl to $C_{20}$, aliphatic, cycloaliphatic, and arylalkyl, $R_2$ is selected from the group consisting of hydrogen and $R_1$, and $R_3$ is selected from the group consisting of aryl and $R_1$. A β-diketo modified epoxy resin is also disclosed which has the general formula

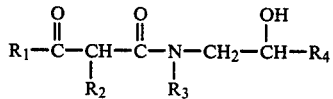

The β-diketo modified epoxy resin is used in resin compositions to increase their adherence to metals and to chelate with metal containing catalysts, forming self-catalyzed resins.

12 Claims, No Drawings

β-KETO AMIDE MODIFIED EPOXY RESINS

BACKGROUND OF THE INVENTION

Epoxy resins are widely used in applications where they are in contact with a metal and must adhere to the metal. These applications include coatings, wire enamels, adhesives, and vacuum pressure impregnation resins. While the epoxy resins exhibit excellent properties in these applications, it is often desirable to increase the adhesion of the epoxy resin to the metal surface in order to prevent separation or flaking.

Epoxy resins are also widely used in the manufacture of laminates. In these applications, a metal-containing catalyst, such as chromium acetylacetonate, can be mixed with the epoxy resin to catalyze its cross-linking and cure. Since these catalysts are not very soluble in the resin composition, they sometimes leach out and prevent the resin from becoming fully cured. This results in a resin having less than the maximum possible mechanical, electrical, and chemical properties.

SUMMARY OF THE INVENTION

I have discovered that certain β-keto amide compounds containing a secondary amido nitrogen will react with epoxy resins through the amido nitrogen group without gelling the epoxy resin. This is a surprising result because amides are well known as curing agents for epoxy resins, and an amide would be expected to completely gel or cure an epoxy resin. The β-keto amides of this invention, however, will not only react with the epoxy resin without gelling or curing it, but the resulting β-keto amide modified epoxy resin can be stored for a long time without gelling.

The β-keto amide modified epoxy resins produced by this reaction are excellent chelating compounds for metal ions, and therefore the β-keto amide modified epoxy resins adhere more strongly to metal surfaces than do unmodified epoxy resins. In addition, metal-containing catalysts, such as chromium acetylacetonate, can be chelated into the resin so that the resins become self-catalytic. As a result, the catalyst will not leach out of the resin and leaves the resin undercured.

DESCRIPTION OF THE INVENTION

Any type of epoxy resin can be modified with β-keto amides in accordance with this invention. This includes bisphenol A epoxy resins, bisphenol S epoxy resins, cycloaliphatic epoxy resins, novolac epoxy resins, glycidyl triazines, thioglycidyl resins, silicon-glycidyl resins, and fluorine-glycidyl resins. Preferred epoxy resins are the bisphenol A epoxy resins and the cycloaliphatic epoxy resins as they are the most readily available. Particularly preferred is the diglycidyl ether of neopentyl glycol because it has an initial low viscosity, which makes it easier to blend with more viscous bisphenol A epoxy resins, and its potential co-reactivity with other epoxy resins and carboxylic anhydrides is high.

The β-keto amides used in modifying the epoxy resins according to this invention have the general formula

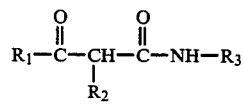

where $R_1$ is alkyl to $C_{20}$, aliphatic, cycloaliphatic, or arylalkyl, $R_2$ is hydrogen or $R_1$, and $R_3$ is aryl or $R_1$.

The $R_1$ group is preferably methyl as these compounds are more available and are more soluble in solvents and in epoxy resins. The $R_2$ group is preferably hydrogen because hydrogen increases the isomerism between the enol and the keto forms of the β-keto amide. The enol form is needed for complex formation with metals, and when $R_2$ is hydrogen the reaction rate in forming the complex is increased. Finally, the $R_3$ group is preferably aryl as those compounds are less reactive and therefore the resulting β-keto amide modified epoxy resin can be more easily B-staged; that is, it can be reacted to a partially cured non-tacky stage without the reaction proceeding to a complete cure. Examples of suitable β-keto amides include acetoacetanilide, aceto-o-anisidide, aceto-o-toluidide, aceto-p-anisidide, aceto-p-toluidide, aceto-o-xylidide, aceto-o-beta-naphthylidide(acetoaceta-beta-naphthlamine), and aceto-o-alpha-naphthylidide(acetoaceta-alpha-naphthylamine). Acetoacetanilide is preferred because it is readily available and has been found to work well.

While a catalyst, such as stannous octoate, can be used in the reaction of the β-keto amide with the epoxy resin, it is preferable that no catalyst be present as one is not needed and a catalyst may adversely affect the properties of the resin. The reaction between the epoxy resin and the β-keto amide proceeds at temperatures of about 135° to about 175° C. Lower temperatures require excessively long reaction times, and higher temperatures may degrade the resin. The reaction time depends upon the particular materials used for the reactants, but is generally about 1 to about 6 hours, and is preferably 2 to about 3 hours. In this reaction, about 0.1 moles to about 2 moles of the β-keto amide are used per epoxy equivalent weight (EEW) of the epoxy resin. If less β-keto amide is used the properties of the epoxy resin will not be significantly altered and if more β-keto amide is used it may be difficult to cross-link the epoxy resin and fully cure it. Preferably, about 0.8 to about 1.2 moles of the β-keto amide are used per epoxy equivalent weight of the epoxy resin. The resulting β-keto amide modified epoxy resin have the general formula

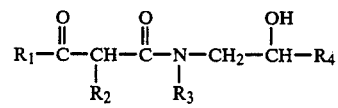

where $R_1$, $R_2$, and $R_3$ were hereinabove defined, and $R_4$ has the same definition as $R_3$, though the group need not be identical.

The β-keto amide modified epoxy resins of this invention can be used in various resin compositions for various purposes. For example, they can be blended with other epoxy resins and epoxy curing agents, such as anhyrides or benzyldimethyl amine, with or without solvents, and used to coat metals or as a wire enamel. The metals are immersed in the composition, excess resin composition is removed, and the composition remaining on the metal surface is heated until it is fully cured. The modified epoxy resins can also be used as adhesives, again by adding other epoxy resins and an epoxy curing agent. They can also be blended into vacuum pressure impregnation (VPI) resins to improve the adherence of the VPI resin to metal surfaces. The β-keto amide modified epoxy resins can be used in preparing laminates by mixing them with other epoxy resins and curing agents, such dicyandiamide and tetrabromo bisphenol A, impregnating porous sheets of a substrate, such as paper or cloth, with the composition, and heating to the B-stage to prepare prepregs. The prepregs are then stacked and heated under pressure to the C-stage to form the laminates. Copper-clad laminates can be prepared by including sheets of copper at one or both ends of the stack; the use of the β-keto amide modified epoxy resins of this invention in the laminating resin increases the adherence of the resin to the copper sheets. Self-catalytic resins can be made by adding metal containing catalysts, such as chromium acetylacetonate, to the β-keto amide modified epoxy resins. The resins form a chelate with the metal ion in the catalyst preventing it from leaching out of the resin. Further information on the use of metal containing catalyst to cure epoxy resins can be found in U.S. Pat. No. 4,137,275, herein incorporated by reference. Other uses for the β-diketo modified epoxy resins of this invention will no doubt occur to those skilled in the art.

The following examples further illustrate this invention.

EXAMPLE 1

About 5 grams of a diglycidylether of neopentyl glycol was mixed with about 2 grams of acetoacetanilide at room temperature. After two days at room temperature no reaction appeared to have occurred. Under these conditions acetoacetanilide was largely insoluble in the neopentyl glycol. However, after warming the mixture up to 150° C. for 2 hours a clear solution was obtained which remained clear after cooling to room temperature. An approximately 10-fold increase in the viscosity of the diglycidyl ether of neopentyl glycol indicated that a significant reaction had occurred between the two materials. The absence of a precipitate on cooling further confirmed that a significant reaction had occurred. Infrared analysis also confirmed that a reaction had occurred between the anilide and epoxy groups. The reaction is believed to be as follows:

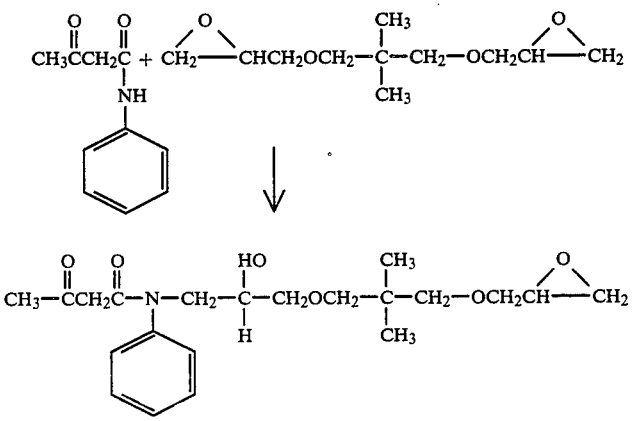

EXAMPLE 2

About 6 g. of the diglycidyl ether of 1,4-butanediol (DGBD) was mixed with about 2 g. of acetoanilide at room temperature (25° C.). No reaction appeared to occur until the mixture was warmed up to 150° C. After about 2 hours at 150° C., a clear solution was obtained which remained clear after cooling back to room temperature. An appreciable increase in the viscosity of the DGBD indicated that a reaction had occurred.

EXAMPLE 3

The following formulation was made up:

| | |
|---|---|
| 70 pbw* | liquid diglycidyl ether of bisphenol A, (EEW = 172 to 176), sold by Dow Chemical Co. under the trade designation "DER 332" |
| 30 pbw | diglycidyl ether of neopentyl glycol |
| 100 pbw | 1-methyltetrahydrophthalic anhydride |
| 0.1 pbw | chromium acetylacetonate |

*parts by weight

This formulation was split into two parts. To one part was added 20% by weight of the product of Example 2, while the other part was left as a control. Aluminum and copper strips were coated with the two resin and cured overnight at 150° C.

After curing, the resins were peeled from the metal strips. Both resins were well bonded to both strips, but it was clearly apparent that the β-keto amide modified epoxy resin had a higher bond strength, particularly to the copper. This was evidenced by the fact that, on stripping this sample, the resin did not come off "clean" from the metal surface as did the unmodified resin. Presumably, the β-keto amide modified epoxy resin was so well bonded to the metals that delamination between the resin layers was occurring.

A similar experiment was performed using the product of Example 1 with identical results.

I claim:
1. A composition comprising:
   (A) an epoxy resin;
   (B) about 0.1 to about 2 moles per epoxy equivalent weight of a β-keto amide having the general formula

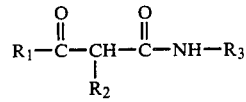

where $R_1$ is selected from the group consisting of alkyl to $C_{20}$, aliphatic, cycloaliphatic, and arylakyl, $R_2$ is selected from the group consisting of hydrogen and $R_1$, and $R_3$ is selected from the group consisting of aryl and $R_1$.

2. A composition according to claim 1 wherein $R_1$ is methyl, $R_2$ is hydrogen, and $R_3$ is aryl.

3. A composition according to claim 1 wherein the amount of said β-keto amide is about 0.8 to about 1.2 moles per epoxy equivalent weight.

4. A β-keto amide modified epoxy resin comprising a composition according to claim 1 heated at about 135° to about 175° C. for about 1 to about 6 hours.

5. A β-keto amide modified epoxy resin having the general formula

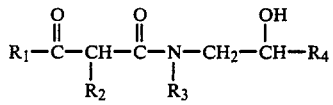

where $R_1$ is selected from the group consisting of alkyl to $C_{20}$, aliphatic, cycloaliphatic, and arylakyl, $R_2$ is selected from the group consisting of hydrogen and $R_1$, and $R_3$ and $R_4$ are independently selected from the group consisting of aryl and $R_1$.

6. A β-keto amide modified epoxy resin according to claim 5 wherein $R_1$ is methyl, $R_2$ is hydrogen, and $R_3$ is aryl.

7. A β-keto amide modified epoxy resin according to claim 6 wherein $R_4$ is

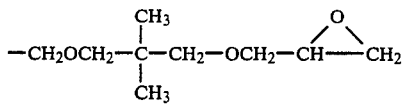

8. A β-keto amide modified epoxy resin according to claim 5 which is chelated with a metal ion.

9. A β-keto amide modified epoxy resin according to claim 8 wherein said metal ion is chromium in chromium acetylacetonate.

10. A composition comprising a β-keto amide modified epoxy resin according to claim 5, an epoxy resin, and an epoxy curing agent.

11. A prepreg comprising a sheet of a porous substrate impregnated with a composition according to claim 10 cured to the B-stage.

12. A laminate comprising a stack of prepregs according to claim 11, heated under pressure to the C-stage.

* * * * *